United States Patent
Dressler et al.

(10) Patent No.: US 11,364,526 B2
(45) Date of Patent: Jun. 21, 2022

(54) FLATNESS CONTROL USING OPTIMIZER

(71) Applicant: Primetals Technologies Germany GmbH, Erlangen (DE)

(72) Inventors: Matthias Dressler, Erlangen (DE); Andreas Maierhofer, Marloffstein (DE); Andreas Müller, Langenzenn (DE); Alexander Thekale, Erlangen (DE); Slobodan Veljovic, Erlangen (DE)

(73) Assignee: Primetals Technologies Germany GmbH, Erlangen (DE)

( * ) Notice: Subject to any disclaimer, the term of this patent is extended or adjusted under 35 U.S.C. 154(b) by 190 days.

(21) Appl. No.: 16/651,040

(22) PCT Filed: Jun. 12, 2018

(86) PCT No.: PCT/EP2018/065427
§ 371 (c)(1),
(2) Date: Mar. 26, 2020

(87) PCT Pub. No.: WO2019/068376
PCT Pub. Date: Apr. 11, 2019

(65) Prior Publication Data
US 2020/0246851 A1  Aug. 6, 2020

(30) Foreign Application Priority Data
Oct. 2, 2017  (EP) .................................... 17194392

(51) Int. Cl.
*B21B 37/40* (2006.01)
*G01B 7/28* (2006.01)
(Continued)

(52) U.S. Cl.
CPC ............. *B21B 37/40* (2013.01); *B21B 37/28* (2013.01); *G01B 7/28* (2013.01); *G05B 19/18* (2013.01);
(Continued)

(58) Field of Classification Search
CPC ........... B21B 37/40; B21B 37/28; G05B 7/28; G05B 19/18–19
(Continued)

(56) References Cited

U.S. PATENT DOCUMENTS 5,126,947 A * 6/1992 Koyama ................. B21B 37/42
                                                             700/154
5,638,134 A * 6/1997 Kameyama .............. H04N 5/21
                                                             348/607
(Continued)

FOREIGN PATENT DOCUMENTS

RU    2189875 C2    9/2002
RU    2211102 C1    8/2003
(Continued)

OTHER PUBLICATIONS

International Search Report and Written Opinion received in PCT/EP2018/065427 dated Aug. 17, 2018, pp. 11.
(Continued)

*Primary Examiner* — Md Azad
(74) *Attorney, Agent, or Firm* — Liang & Hennessey LLP; Brian Hennessey (57) ABSTRACT

A metal strip is rolled in a roll stand and a control device for the roll stand determines, by means of a working cycle, a number of manipulated variables for flatness actuators of the roll stand and actuates them accordingly. The control device implements an optimizer, which provisionally sets the current correction values, and determines a totality of flatness values. Then, the optimizer minimizes the relationship by (Continued)

varying the current correction variables. When determining the current correction variables (s), the optimizer considers linear ancillary conditions, based at least in part on a vector having the ancillary conditions upheld by the current correction values and a vector having the ancillary conditions upheld by the difference of the current correction values relative to the correction values of the preceding working cycle. The control device determines the manipulated variables for the flatness actuators in consideration of the determined current correction variables.

16 Claims, 6 Drawing Sheets (51) Int. Cl.
*B21B 37/28* (2006.01)
*G05B 19/416* (2006.01)
*G05B 19/18* (2006.01)
*G05B 19/19* (2006.01)
*G05B 19/23* (2006.01)
*G05B 19/35* (2006.01)
*G05B 19/414* (2006.01)
*G05B 19/29* (2006.01)

(52) U.S. Cl.
CPC .......... *G05B 19/19* (2013.01); *G05B 19/235* (2013.01); *G05B 19/296* (2013.01); *G05B 19/356* (2013.01); *G05B 19/416* (2013.01); *G05B 19/4142* (2013.01)

(58) Field of Classification Search
USPC ........................................ 700/154
See application file for complete search history.

(56) References Cited

U.S. PATENT DOCUMENTS

| | | | | |
|---|---|---|---|---|
| 6,098,060 | A | 8/2000 | Yuan et al. | |
| 6,199,418 | B1* | 3/2001 | Tezuka | B21B 37/28 72/9.1 |
| 6,438,443 | B1* | 8/2002 | Berghs | B21B 37/28 700/148 |
| 7,577,489 | B2* | 8/2009 | Fodor | B21B 37/28 700/154 |
| 2002/0050070 | A1* | 5/2002 | Jelali | B21B 37/28 33/567 |
| 2008/0271508 | A1* | 11/2008 | Kruger | B21B 37/28 72/12.3 |
| 2009/0249849 | A1* | 10/2009 | Martin | B21B 37/28 72/9.1 |
| 2010/0211209 | A1* | 8/2010 | Meissen | B21B 37/00 700/173 |
| 2012/0253502 | A1* | 10/2012 | Holm | B21B 13/147 700/154 |
| 2016/0052032 | A1* | 2/2016 | Moden | B21B 37/42 72/12.7 |

FOREIGN PATENT DOCUMENTS

| | | | | |
|---|---|---|---|---|
| RU | 2578328 | C2 | 3/2016 | |
| WO | 9519591 | A1 | 7/1995 | |
| WO | 2006132585 | A1 | 12/2006 | |
| WO | WO-2010146615 | A1 * | 12/2010 | ............. B21B 37/28 |

OTHER PUBLICATIONS

Russian Office Action and Search Report received in Russian Application No. 2020112298 dated Sep. 27, 2021, 17 pages.

* cited by examiner

FLATNESS CONTROL USING OPTIMIZER

CROSS-REFERENCE TO RELATED APPLICATIONS

The present application is a national phase application of PCT Application No. PCT/EP2018/065427, filed Jun. 12, 2018, entitled "EVENNESS CONTROL USING OPTIMIZER", which claims the benefit of European Patent Application No. 17194392.1, filed Oct. 2, 2017, each of which is incorporated by reference in its entirety.

BACKGROUND OF THE INVENTION

1. Field of the Invention

The present invention relates to a roll stand in which a metal strip is rolled.

2. Description of the Related Art

The present invention relates to an operating method for a roll stand in which a metal strip is rolled,
wherein a control device for the roll stand determines by means of a working cycle in each case a number of manipulated variables for a corresponding number of flatness actuators of the roll stand and actuates the flatness actuators according to the manipulated variables determined.

The present invention further relates to a computer program comprising machine code that can be executed by a control device for a roll stand for rolling a metal strip, wherein the execution of the machine code by the control device causes the control device to operate the roll stand according to such an operating method.

The present invention further relates to a control device for a roll stand for rolling a metal strip, wherein the control device is embodied as a software-programmable control device and programmed with such a computer program so that it operates the roll stand according to such an operating method.

The present invention further relates to a roll stand for rolling a metal strip,
wherein the roll stand comprises a number of flatness actuators that are able to influence the flatness of the metal strip emerging from the roll stand,
wherein the roll stand comprises such a control device by means of which the flatness actuators of the roll stand are actuated according to such an operating method.

The aforementioned subject matter is, for example, disclosed in US 2016/0 052 032 A1. US 2016/0 052 032 A1 includes a singular value decomposition of the so-called stand matrix. The singular value decomposition is used as the basis for determining combinations of the manipulated variables for the flatness actuators in the eigenvalue system of the roll stand from which the manipulated variables for the flatness actuators are then determined.

WO 2006/132 585 A1 discloses a method for optimization of flatness control when rolling a strip, wherein the actuation of any number of actuators is optimized. The flatness error—i.e. the target-actual deviation is determined. This flatness error is subjected to a singular value decomposition. The singular value decomposition takes account of ancillary conditions, namely actuator limitations.

WO 95/19591 A1 discloses a method for running a process, in particular the rolling of a strip and the flatness control thereof. WO 95/19591 A1 essentially relates to the determination of the effectiveness of the individual members and tracking them if required. It further discloses a usual regulation based on a target-actual comparison.

U.S. Pat. No. 6,098,060 A discloses a method for controlling a process with which manipulated variables are determined for a plurality of actuators that influence a process. Flatness control for a metal strip is cited as an example of such a process. The object of U.S. Pat. No. 6,098,060 A is to achieve optimum process control.

The flatness of a metal strip is usually described as the local or global difference in the length of the metal strip as a function over the width of the strip. In the context of the rolling process, a target flatness which the metal strip should possess after rolling, if possible, is specified.

The flatness of the metal strip is influenced by various effects. Some of these effects occur during the rolling of the metal strip and cannot be influenced. An example of such an effect is a change in the rolling force during the rolling of the metal strip. Other such effects can be influenced by corresponding actuation of members of the roll stand—hereinafter called flatness actuators. For example, both the roll reverse bending and—assuming there is a corresponding roll grinding—axial roll displacement exert an influence on the evenness. The same applies to a location-dependent temperature influence over the width of the metal strip or the working rolls, for example cooling.

In the context of flatness control, the effect of such ~~evenness members~~ flatness actuators on flatness can be considered to be substantially proportional to the actuation of the respective flatness actuator. Therefore, it is possible to describe the change in the flatness by a change in the manipulated variable of the corresponding flatness actuator and the effectiveness of the corresponding flatness actuator.

The aim of any flatness control is to keep the flatness of the metal strip as constant as possible over the entire length of the strip and thus to approximate the target flatness as closely as possible. To this end, in the context of flatness control, it is attempted to compensate a measured deviation from the target flatness with the aid of the flatness members. For this purpose, settings of the flatness actuators are determined such that the sum of the resulting changes in flatness counteracts the control deviation and compensates it as well as possible. This is then referred to as an optimum operating point.

In the prior art, the determination of the effectiveness of the flatness actuators is often performed manually and in advance. In particular in the case of the active rolling of a metal strip, there is a slight additional actuation of a respective flatness actuator and the resulting effect is detected. The resulting effectiveness is stored in the control device for the roll stand. This procedure is error-prone, time-consuming and inaccurate. Furthermore, if they can be detected at all, changes in the effectiveness can only be detected with a significant time delay. The time delay is often in the range of months.

Furthermore, when a plurality of flatness actuators are used, it is difficult to find the optimum working point. Although the above-mentioned US 2016/0 052 032 A1 represents a certain degree of progress, there is still room for improvement. In particular, in the context of this method, all the flatness actuators can only be optimized simultaneously, but not individually or sequentially. Furthermore, with this approach, the boundary conditions to which the flatness actuators are subjected cannot be taken into account in the context of the determination of the manipulated variables. However, taking these into account subsequently generally has the result that it is no longer possible to achieve the optimum. Operating the roll stand outside the optimum working point often results in increased wear and increased erosion of the flatness actuators or other elements of the roll stand.

Furthermore, it is often not possible to actuate the flatness actuators independently of one another. In particular, it may be the case that the actuation of one flatness actuator and the actuation of another flatness actuator impair, compensate or disrupt each another. It is very difficult to find the optimum working point under these conditions.

Furthermore, the measured flatness values are generally detected by means of a corresponding measuring device arranged downstream of the roll stand. The measuring device can, for example, be embodied as a segmented measuring roller. Faults are generally compensated by means of PI (Proportional Integral) controllers. These undergo extensive parameterization during the commissioning of the roll stand. Due to the distance of the measuring device and the relatively slow reaction of the flatness actuators, the control is very sluggish. It is therefore necessary to accept quality losses since faults can only be compensated slowly.

US 2006/0 282 177 A1 discloses the control of a technical system using the interior-point method. Herein, the associated optimizer resolves an optimization problem that includes the desired states of the system, the control variables and linear boundary conditions. US 2006/0 282 177 A1 cites a gas turbine as a typical application for the technical system.

The technical paper "Real-time Dynamic Optimization of Nonlinear Systems: A Flatness-based Approach" by M. Guay, Proceedings of the 44th IEEE Conference on Decision and Control, and the European Control Conference 2005, pages 5842 to 5847, discloses an interior-point method for real-time control. Typical applications cited are batch processes generally and a bioreactor specifically.

The lecture paper "C21 Model Predictive Control" by Mark Cannon, University of Oxford, 2016, discloses a model-predictive controller. Typical applications cited for the controller include hot rolling and the target variables cited include residual stress. An interior-point method is cited as a possible solution method.

CN 104 698 842 A cites an interior-point method for solving a non-linear optimization problem. It mentions that the boundary conditions considered are in particular the upper and lower limits of the manipulated variables and the change in the manipulated variables. It appears that only the target variables and the change in the manipulated variables are included in the cost function.

SUMMARY OF THE INVENTION

The object of the present invention consists in the provision of possibilities by means of which enhanced flatness control is achieved.

According to the invention, an operating method for a roll stand of the type cited in the introduction is embodied in that, the control device implements a first optimizer, which initially provisionally sets the current correction values and determines a totality of flatness values according to the relationship $$f(s) = f0 + W \cdot (s-s') \text{ or } f(s) = f0 + W \cdot s,$$

wherein
f is the totality of flatness values,
s is a totality of the current correction values,
f0 are initial flatness values,
W is an effectiveness matrix and
s' is a totality of the correction values determined in the preceding working cycle,
and then minimizes the relationship $$\|f(s-s0)-f^*\|+\alpha\|s-s0\|+\beta\|s-s'\| \tag{1}$$

by varying the current correction values (s), wherein
$f^*$ is a totality of flatness target values,
s0 is a totality of target values for the correction values and
$\alpha$ and $\beta$ are weighting factors,
that the first optimizer considers linear, preferably exclusively linear, ancillary conditions when determining the current correction values,
that the linear ancillary conditions have the form $$C \cdot s \leq B$$

or the form $$C \cdot s \leq B \text{ and } |s-s'| < c,$$

wherein C is a matrix, B is a vector having the ancillary conditions to be upheld by the current correction values and c is a vector having the ancillary conditions to be upheld by the difference between the current correction values (s) and the correction values of the preceding working cycle and that the control device determines the manipulated variables for the flatness actuators taking account of the varied current correction values.

The flatness actuators can be determined as required. For example, in the case of a normal roll stand (in particular a four-high stand or a six-high stand), the flatness actuators can be the roll displacement, the roll reverse bending and the segmented temperature influence. If applicable, it is also possible to achieve an inclined roll position—in particular with working rolls. In the case of a cluster roll stand, for example a 12-roller roll stand or a 20-roller roll stand, it is also possible for other flatness actuators and a greater number of flatness actuators to be achieved.

In relationship 1, the first term stands for the actual-target error, i.e. the deviation of the calculated flatness from the target evenness. The second term ensures the lowest possible deviation of the control of the flatness actuators from the target values. The target values can, for example, be determined such that the associated flatness actuators are stressed as little as possible. The third term ensures the smallest possible change in the control of the flatness actuators. The weighting factors are non-negative. Generally, at least one of the weighting factors is greater than 0. Often, both weighting factors are greater than 0. A value of 0 for both weighting factors may be advisable in individual cases, for example when only one single flatness actuator is available. In this case, the norm for the first term, i.e. for the actual-target error, can, for example, be obtained by simple absolute value generation.

The norm used can be determined individually for each term. Generally, in each case this is the "normal" Euclidean norm, i.e. the root of the sum of the squares of the individual terms.

The totality of the initial flatness values corresponds to a vector of the initial evenness. Similarly, the totality of the flatness target values corresponds to a vector of the target evenness. The spatial resolution in the width of the strip can be as required. It is typically more than 10 support points, often more than 50 support points. In some cases, there are up to 100 support points, in rare cases even more.

Hence, because of the way the optimization problem is approached, the first optimizer solves a non-linear optimization problem with linear ancillary conditions. In particular, due to this circumstance, the first optimizer has an online-capability. Furthermore, simultaneously taking account of the ancillary conditions during the optimization, enables the optimum solution to be determined in a simple manner.

A first basic embodiment of the present invention provides,
that a measuring device is used to detect measured flatness values in a spatially resolved manner over the width of the metal strip,
that the measured flatness values and the associated flatness target values are supplied to the control device and
that the measured flatness values are supplied to the control device as initial flatness values.

Similarly to the above, the totality of the measured flatness values corresponds to a vector of the actual evenness.

In the first basic embodiment, the control device generally implements not only the first optimizer, but also an flatness controller arranged downstream of the first optimizer to which the current correction values determined by the first optimizer are supplied and which determines change values for the manipulated variables for the flatness actuators from the current correction values. In a preferred embodiment of the present invention, the flatness controller is embodied as a controller that operates in accordance with the observer principle. Therefore, the flatness controller is embodied such that it
forms the sum of the current correction values weighted with a gain factor and the output signal from a plant model of the roll stand,
determines a provisional signal based on the sum formed in this way,
determines the change values for the manipulated variables for the flatness actuators by differentiating the provisional signal and
supplies the provisional signal to the plant model of the roll stand as an input signal.

Herein, the plant model of the roll stand can include different submodels for the different flatness actuators. The different submodels can in particular take account of the respective dynamics of the respective flatness actuator individually.

In the simplest case, the provisional signal is identical to the sum formed. However, the flatness controller preferably determines the provisional signal by filtering the sum formed in a filter. In the embodiment with this procedure, it is furthermore possible for the control device to parameterize the filter dynamically.

In some cases, it is advisable for the control device to implement—additionally to the first optimizer—a second optimizer, which is structured in the same way as the first optimizer and which therefore determines current correction values in the same manner as the first optimizer. However, in this case it is provided
that the totality of flatness values for the second optimizer is determined based on a totality of nominal flatness values and the valid current correction values for the second optimizer,
that the nominal flatness values correspond to a nominal change in the rolling force,
that the weighting factors for the second optimizer have the value 0 and
that the control device determines the manipulated variables for the flatness actuators while additionally taking into account an actual change in the rolling force, the nominal change in the rolling force and the current correction values determined by means of the second optimizer.

Therefore, the second optimizer determines its current correction values independently of the first optimizer. The result determined by means of the second optimizer—in particular the quotient of the respective current correction value and the nominal change in the rolling force—corresponds to the effectiveness of the respective flatness actuator. Therefore, multiplied with the change in the rolling force, this enables a direct determination of the associated manipulated variable. This procedure has the advantage that it works very quickly since it is not necessary to wait until the respective rolled section of the rolling stock reaches the measuring device.

In individual cases, it is also possible that, even if only the first optimizer is present, the first optimizer works in the manner as explained above for the second optimizer. Although this procedure represents a pure control, it has the advantage that it reacts quickly and can be used with any roll stand independently of whether a measuring device for detecting the measured flatness values is arranged downstream of the respective roll stand.

Preferably, the first optimizer varies the current correction values in a plurality of iterations. This enables the optimum of the current correction values to be determined particularly efficiently.

Preferably, the first optimizer stops varying the current correction values as soon as
it has carried out a predetermined number of iterations and/or
it has varied the current correction values for a predetermined time and/or
the current correction values only change insignificantly from iteration to iteration and/or
the relationship $$\|f(s)-f^*\|+\alpha\|s-s0\|+\beta\|s-s'\|$$

now only changes insignificantly and/or
another termination criterion is met.

This enables the online capability and hence the real-time capability to be retained in particular even when the variation of the current correction values only results in slow convergence.

It is possible for the first optimizer not to consider the ancillary conditions on each iteration, only to take them into account in the final result. However, preferably, the first optimizer considers the ancillary conditions in each iteration.

Preferably, the first optimizer determines the current correction values according to an interior-point method. Such methods are robust, converge very quickly and, above all, require only relatively little storage space. This enables the optimization to be carried out online in the context of the flatness control.

In a preferred embodiment, the control device determines the effectiveness matrix automatically based on models of the roll stand. This enables the effectiveness of the flatness actuators to be determined quickly and reliably. In particular, there is no need for tests in which a metal strip is rolled. Examples of suitable models of the roll stand are a rolling force model, a bending model, a flattening model, a roll nip model, a model for modeling the thermal and wear-induced camber of rolls and further models.

The determination of effectiveness matrix takes place at least at the time of the commissioning of the roll stand. However, preferably, the control device redetermines the effectiveness matrix dynamically in each case immediately before the commencement of the rolling of a respective metal strip. Therefore, preferably, the models are retrieved and evaluated again for each metal strip to be rolled before the rolling of the respective metal strip and the effectiveness matrix determined based on the evaluation.

It is even better if the control device also tracks the effectiveness matrix dynamically during the rolling of the respective metal strip. For example, the control device can also retrieve and evaluate the models again during the rolling of the respective metal strip. It is also possible for the tracking of the effectiveness matrix to be based on an evaluation of a model-based determination of expected flatness values and the measured flatness values. Such an evaluation can, for example, be performed using a neural network.

The object is furthermore achieved by a computer program. According to the invention, the execution of the computer program causes the control device to operate the roll stand according to an operating method according to the invention.

The object is furthermore achieved by a control device for a roll stand for rolling a metal strip. According to the invention, the control device is programmed with a computer program according to the invention so that it operates the roll stand according to an operating method according to the invention.

The object is furthermore achieved by a roll stand for rolling a metal strip. According to the invention, the roll stand comprises a control device according to the invention by which the flatness actuators of the roll stand are actuated according to an operating method according to the invention.

BRIEF DESCRIPTION OF THE DRAWINGS

The above-described properties, features and advantages of this invention and the manner in which they are achieved will become clearer and more plainly comprehensible in conjunction with the following description of the exemplary embodiments explained in more detail in conjunction with the drawings. The drawings show in schematic form.

DETAILED DESCRIPTION

Figure 1:
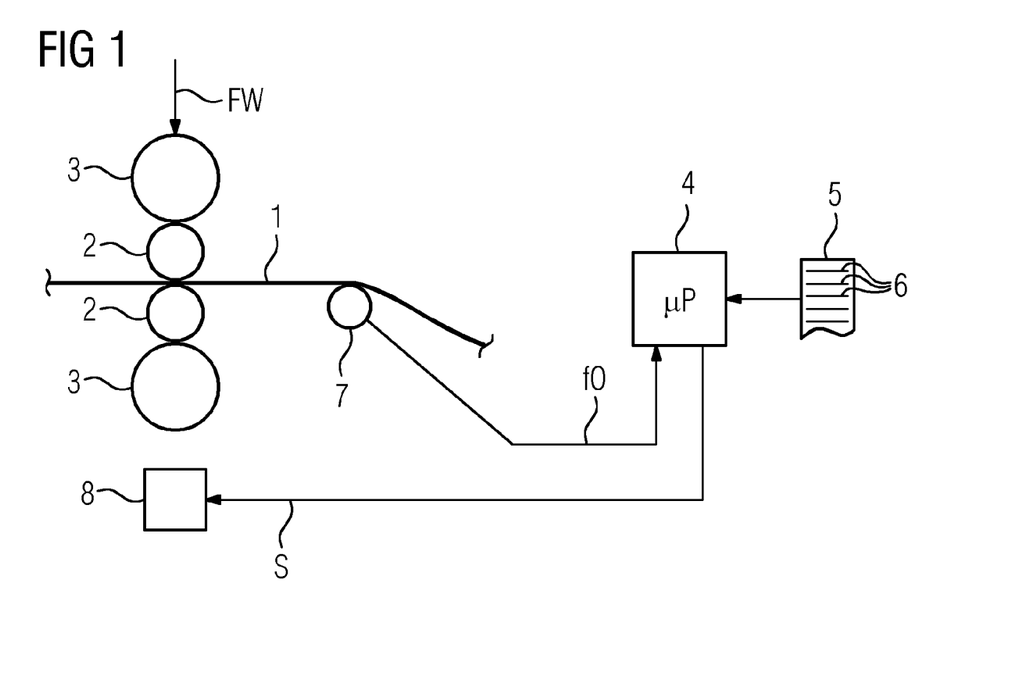
FIG. 1 a roll stand for rolling a metal strip from the side,
FIG. 2 the roll stand in FIG. 1 from above,
FIG. 3 the roll stand in FIG. 1 viewed in the direction of transport of the metal strip,
FIG. 4 a measuring device from below,
FIG. 5 the internal structure of a control device,
FIG. 6 a flowchart,
FIG. 7 a modification of the internal structure in FIG. 5, and
FIG. 8 an alternative embodiment of the internal structure in FIG. 5.
Figure 2:
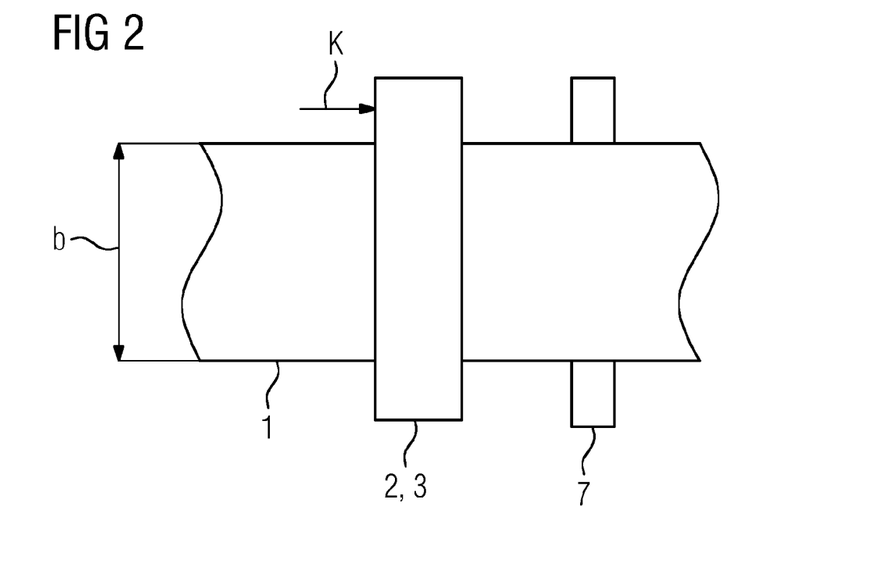
Figure 3:
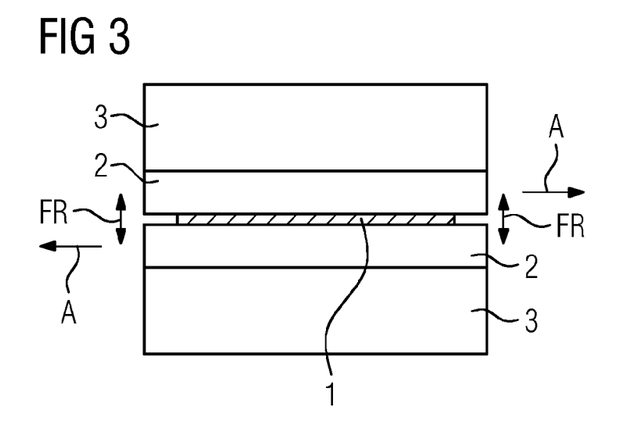

According to FIGS. 1 to 3, a roll stand for rolling a metal strip 1 includes a number of rolls 2, 3. Generally, additionally to working rolls 2, the rolls 2, 3 comprise support rolls 3. Frequently, no further rolls are present. In this case, the roll stand is a four-high stand. In some cases, further rolls are also present, for example in the case of a six-high stand an intermediate roll in each case between the two working rolls 2 and the two support rolls 3. Other embodiments are also known, for example a 12-roller roll stand or a 20-roller roll stand.

The roll stand is controlled by a control device 4. The control device 4 is generally embodied as a software-programmable control device. This is indicated in FIG. 1 by the reference "µP" (for "microprocessor") within the control device 4. The control device 4 is programmed with a computer program 5. The computer program 5 comprises machine code 6 that can be executed by the control device 4. The execution of the machine code 6 by the control device 4 causes the control device 4 to operate the roll stand according to an operating method according to the invention.

Figure 4:
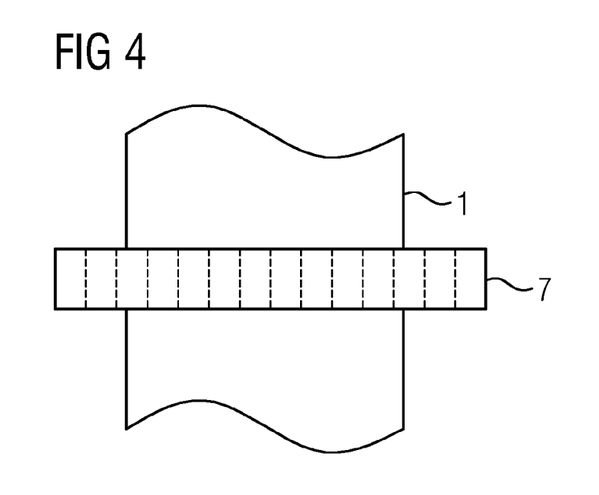
Figure 5:
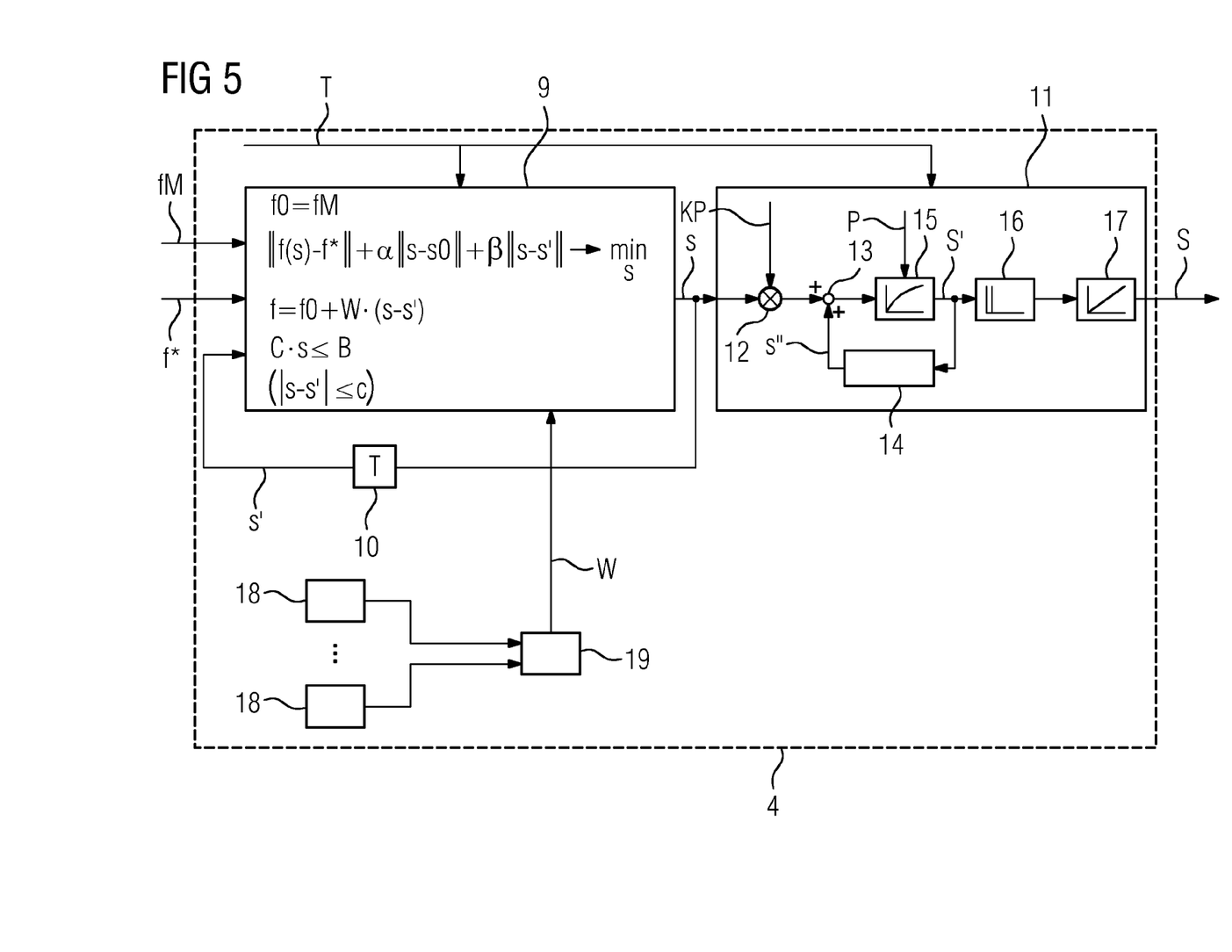

The following initially explains a first basic embodiment in greater detail with additional reference to FIGS. 4 and 5.

In the context of the first basic embodiment, a measuring device 7 by means of which measured flatness values fM are detected during the operation of the roll stand is arranged downstream of the roll stand in accordance with FIG. 1. The detection of the measured flatness values fM takes place in a spatially resolved manner over the width b of the metal strip 1. For example, the measuring device 7 can be embodied in accordance with the depiction in FIG. 4 as a segmented measuring roller arranged on the outlet side of the roll stand. Such segmented measuring rollers are generally known to those skilled in the art. Due to the detection of the measured flatness values fM in a spatially resolved manner over the width b of the metal strip 1, the measured flatness values fM do not represent a scalar, but a vector. Therefore, fM designates the totality of the measured flatness values fM and not only one single value detected at a specific location viewed in the width of the metal strip 1. The spatial resolution can be as required. The number of support points for which in each case an individual measured flatness value fM is detected often fluctuates within the upper double-digit range.

The measured flatness values fM are supplied to the control device 4 as initial flatness values f0 in accordance with FIG. 5. Furthermore, associated flatness target values f* are supplied to the control device 4. Hence, the flatness target values f* also do not entail one single target value, but the totality of the flatness target values f*, i.e. a corresponding vector.

The control device 4 determines by means of a working cycle T in each case a number of manipulated variables S for a corresponding number of flatness actuators 8 and actuates these according to the manipulated variables S determined. Therefore, the manipulated variables S are determined anew with each working cycle T. They then remain valid until the next determination of the manipulated variables S. The working cycle T is generally in a range of less than 1 second, for example between 0.2 seconds and 0.5 seconds.

The flatness actuators 8 are used to influence the flatness of the metal strip 1 emerging from the roll stand. For example, corresponding reverse-bending devices can exert reverse bending forces FR on the working rolls 2. Alternatively or additionally, if applicable, the working rolls 2 (or, if present, the intermediate rolls) can be axially displaced in accordance with an axial displacement A. Alternatively or additionally, a corresponding device can exert a segmented temperature influence. For example, a cooling device can be used for a respective local cooling K of the working rolls 2. Other flatness actuators 8 are also possible.

FIG. 5 shows the internal structure of the control device 4 for the first basic embodiment of the present invention. However, the blocks depicted in FIG. 5 are generally provided not as hardware, but as program modules. Therefore, they are obtained by executing the machine code 6 of the computer program 5.

In accordance with FIG. 5, the control device 4 implements an optimizer 9. In the following, the optimizer 9 is referred to as a first optimizer. In the context of the embodiment shown in FIG. 5, the first optimizer 9 is the sole optimizer.

Generally speaking, an optimizer for the purpose of the present invention is an arithmetic block to which certain input variables are supplied. The arithmetic block then determines a target function into which the input variables and the output variables applied by the arithmetic block are entered. The arithmetic block then varies the output variables with aim of optimizing the target function. To this end, the arithmetic block generally carries out a plurality of iterations, wherein it in each case determines in each iteration, in each case on the basis of the input variables and the last output variables applied, the target function and, on the basis of the target function determined, varies the output variables with the aim of optimizing the target function. Such optimizers are generally known to those skilled in the art. Purely by way of example, reference is made to optimizers which work in accordance with the following methods:

- continuous optimization methods, such as, for example, simplex methods, interior-point methods, trust-region methods, cubic-overregularization methods, SLP (Sequential Linear Programming) methods and methods of the Gaussian/Newtonian type, for example SQP (Sequential Quadratic Programming) methods. These methods can be embodied as linear or non-linear as required.
- methods of discrete optimization such as, for example, cutting-plane methods, methods of the branch-and-bound type, network optimization methods etc.
- methods of mixed-integer optimization, for example as a combination of continuous and discrete methods.
- heuristic and metaheuristic optimization methods, for example genetic methods, evolutionary methods, anticolony optimization methods, swarm methods, simulated annealing and tabu search.
- genetic optimization methods.

If necessary, the above-named optimization methods can be combined with processing in a neural network.

The initial flatness values f0 and the flatness target values f* are supplied to the first optimizer 9. The first optimizer 9 determines correction values s, specifically a separate value in each case for each flatness actuator 8. The correction values s are valid for the current working cycle T and are therefore referred to below as current correction values s. Similarly to the initial flatness values f0 and the flatness target values f*, the reference character s therefore also stands for the totality of the current correction values. Therefore, here once again—at least generally—this is not a scalar, but a vector. However, it is possible in individual cases that only one single flatness actuator 8 will be present. In this case, the vector s degenerates into a scalar. The meaning of the current correction values s will become apparent from later explanations.

The current correction values s are supplied to the first optimizer 9 again. However, they are first delayed by one (1) working cycle T in a time-delay element 10. Therefore, the correction values s' supplied to the first optimizer 9 in a specific working cycle T correspond to the correction values for the previous working cycle T. Therefore, in the following, they are referred to as delayed correction values and given the reference character s'.

The first optimizer 9 determines the current correction values s by minimizing the relationship $$\|f(s)-f^*\|+\alpha\|s-s0\|+\beta\|s-s'\| \tag{5}$$

Therefore, the first optimizer 9 varies the current correction values s until it has minimized this relationship. In other words: the first optimizer 9 initially applies the current correction values s as provisional values. Using the provisionally applied values for the correction values s, the first optimizer 9 then minimizes the above relationship by varying the current correction values s. The valid correction values s for the respective working cycle T are then the most recently determined or last varied current correction values s.

In said relationship, f is a totality of flatness values, i.e. once again a vector. The flatness values f are determined by the first optimizer 9 on the basis of the initial flatness values f0 and the current correction values s. For example, the first optimizer 9 can determine the flatness values f according to the relationship $$f(s)=f0+W\cdot(s-s') \tag{6}$$

W is an effectiveness matrix. It specifies individually what influence a specific individual correction value s has on which of the flatness values f.

s0 is a totality of target values for the correction values s. The target values s0 can, for example, be determined such that the associated flatness actuators 8 are stressed as little as possible, for example actuated as little as possible. The target values s0 can be specified to the control device 5 as fixed. Alternatively, they can be specified to the control device 5 as variables or as parameters.

α and β are weighting factors. In each case, they have a non-negative value. They are generally greater than 0. They can be specified to the first optimizer 9 as fixed or can be parameterizable.

When determining current correction values s, the first optimizer 9 considers ancillary conditions. The ancillary conditions comprise linear ancillary conditions. Preferably, the ancillary conditions even comprise exclusively linear ancillary conditions.

In particular, the first optimizer 9 in each case considers linear ancillary conditions with the form $$C\cdot s\leq B \tag{7}$$

Herein, C is a matrix. B is a vector having the ancillary conditions to be upheld by the current correction values s. In addition, the first optimizer 9 can consider further linear ancillary conditions with the form $$|s-s'|\leq c \tag{8}$$

Herein, c is a vector having the ancillary conditions to be upheld by the difference between the current correction values s and the delayed correction values s'.

Suitable optimizers are known to those skilled in the art per se. Therefore, the first optimizer 9 can be implemented as required. Preferably, the first optimizer 9 determines the correction values s according to an interior-point method.

The current correction values s determined by means of the first optimizer 9—i.e. the current correction values s after the variation of the correction values s—represent the basis on which the control device 4 determines the manipulated variables S for the flatness actuators 8.

Generally, the first optimizer 9 varies the current correction values s in a plurality of iterations. Therefore, it attempts gradually to determine increasingly better current correction values s. In this case, the first optimizer 9 stops varying the current correction values as soon as at least one of the following termination criteria is met:

the first optimizer 9 has carried out a predetermined number of iterations the first optimizer 9 has varied the current correction values s for a predetermined time.

the current correction values s have now only changed insignificantly compared to the preceding iteration. To this end, the term $$\|s-s'\|$$

can be compared with a predetermined threshold. If said term falls below this threshold, the first optimizer 9 detects a now only insignificant change.

The relationship $$\|f(s)-f^*\|+\alpha\|s-s0\|+\beta\|s-s'\|$$

as a whole has now only changed insignificantly compared to the preceding iteration. To this end, said relationship can be compared with a predetermined threshold. If said term falls below this threshold, the first optimizer 9 detects a now only significant change.

Alternatively or additionally, it is also possible for the first optimizer 9 to check whether another termination criterion is met. The decisive factor is that the resulting termination criterion ensures that only a finite number of iterations is performed.

The most recently determined current correction values s must adhere to the ancillary conditions according to inequality (7) or according to the inequalities (7) and (8). This is not mandatorily the case with the correction values s, which are determined in the meantime and will be further varied later. However, preferably, the first optimizer 9 considers the ancillary conditions on every iteration. This is in particular the case when the first optimizer 9 works in accordance with a continuous optimization method, in particular according to an interior-point method.

For the final determination of the manipulated variables S, in the embodiment in accordance with FIG. 5, the control device preferably implements an flatness controller 11. The flatness controller 11 is arranged downstream of the first optimizer 9. The current correction values s determined by the first optimizer 9 are supplied to the flatness controller 11. From these, it determines the manipulated variables S for the flatness actuators 8.

In principle, the flatness controller 11 can be embodied in various ways, for example as a conventional PI controller. However, according to the depiction in FIG. 5, the flatness controller 11 is embodied as controller according to the observer principle.

Consequently, the flatness controller 11 initially multiplies the current correction values s with a gain factor KP by means of a multiplier 12. The gain factor KP is always positive. It is generally less than 1. If possible, the gain factor KP should be chosen as high as possible. The output signal s″ of plant model 14 of the roll stand is added to the weighted current correction values determined in this way in a nodal point 13.

The flatness controller 11 determines a provisional signal S′ on the basis of the sum formed in this way. Similarly to the manipulated variables S and the correction values s, s′, the provisional signal S′ is a vector. In the simplest case, the provisional signal S′ is identical to the sum formed. However, generally the sum formed is filtered in a filter 15 for the determination of the provisional signal S′. The filter 15 can in particular be embodied as a low-pass filter. It is possible for the filter 15 only to be set in the context of the commissioning of the roll stand. However, preferably, the control device 4 can also re-specify parameters P to the filter 15 at later time point and as a result dynamically parameterize the filter 15. The flatness controller 11 then parameterizes the provisional signal S′ in a differentiator 16.

The differentiated signal is then integrated in an integrator 17. The output signal from the integrator 17 corresponds to the manipulated variables S or—if the manipulated variables S are obtained as a sum of a plurality of summands—one of the summands. The manipulated variables S are output to the flatness actuators 8. It is possible for the integrator 17 to be part of the flatness controller 11. Alternatively, it can be arranged outside the flatness controller 11.

The flatness controller 11 supplies the provisional signal S′ to the plant model 14 of the roll stand as an input signal. The plant model 14 models the effect of the flatness actuators 8 from the point of view of the control device 4. In particular, the plant model 14 models the temporal transition behavior with which measuring device 7 detects an flatness error that has occurred in the roll stand nip. The model parameters required for this can generally be readily determined from the system geometry. This is known to those skilled in the art.

Therefore, if an actuation y of a specific flatness actuator 8 takes place at the time point x, the plant model 14 reflects which effect of the actuation y is displayed at which time point t in the detection of the measured values. The plant model 14 takes account of the dynamic behavior of the respective flatness actuator 8. The plant model 14 furthermore takes account of any downtimes, for example the transport time, which (viewed in the direction of transport of the metal strip 1) elapses between the action of the respective flatness actuator 8 on a specific point of the metal strip 1 and the detection of the measured flatness values fM for this point by the measuring device 7. The plant model 14 also takes account of any delay times in the detection of the measured values.

The control device 4 is often able to access models 18 of the roll stand. For example, the models 18 can be integrated in the control device 4. The models 18 model the behavior of the roll stand in operation. The models 18 can, for example, comprise a rolling force model, a bending model, a flattening model, a roll nip model, a model for modelling the thermal and wear-induced camber of rolls 2, 3 of the roll stand and further models. In accordance with the depiction in FIG. 6, at least in the context of the commissioning of the roll stand, the control device 4 preferably retrieves the models 18 in a step S1 and automatically determines the effectiveness matrix W on the basis of the models 18 in a determining device 19. Only then does the rolling of the metal strip 1 or, if applicable, a plurality of metal strips 1, take place in a step S2.

Figure 6:
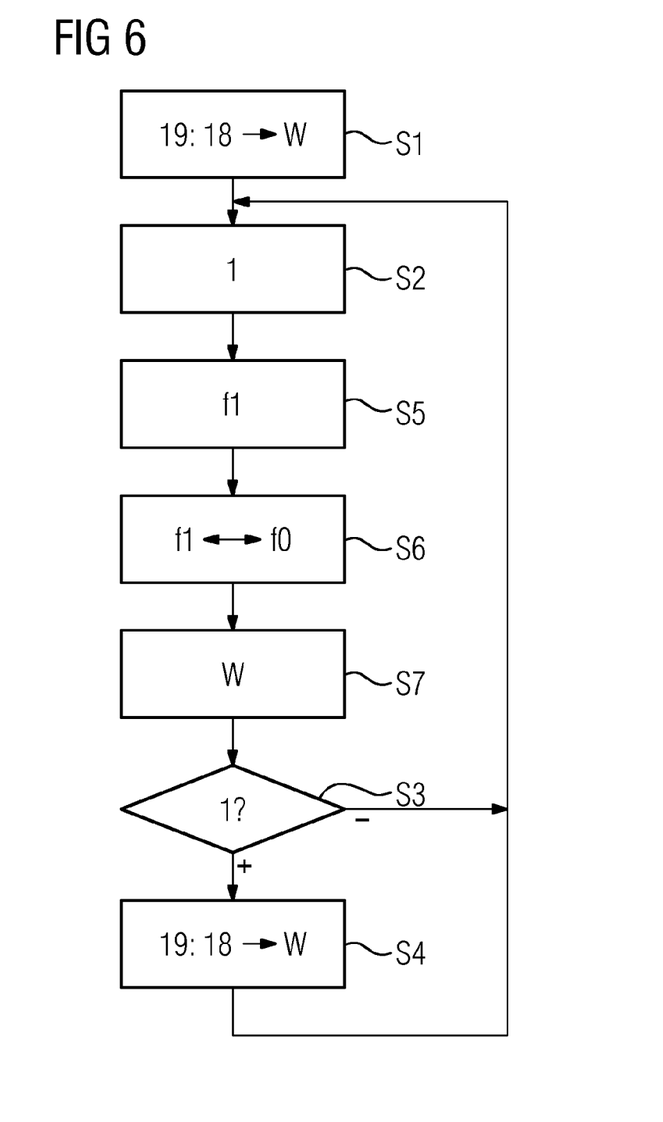

Preferably steps S3 and S4 are additionally available. In this case, the control device 4 checks in the step S3 whether a new metal strip 1 is to be rolled. If this is the case, the control device 4 proceeds to the step S4. In the step S4—as in the step S1—the control device retrieves the models 18 and automatically determines the effectiveness matrix W on the basis of the models 18. Therefore, the steps S3 and S4 also implement the dynamic re-determination of the effectiveness matrix W by the control device 4 in each case immediately before the commencement of the rolling of a respective metal strip 1.

It is even possible for the control device 4 also to track the effectiveness matrix W dynamically during the rolling of the respective metal strip 1. This is also the case with the embodiments explained latter in accordance with FIGS. 7 and 8. If tracking is to take place, in the case of the embodiments in FIGS. 5 and 7, this can be achieved by steps S5 to S7, for example. In this case, the control device 4 determines expected flatness values f1 in the step S5. The expected flatness values f1 can, for example, be determined with the aid of the plant model 14 and/or the models 18 of the roll stand. In the step S6, the control device 4 evaluates the expected flatness values f1 and the measured flatness values fM. On the basis of the evaluation of the step S6, in the step S7, the control device 4 can then track the effectiveness matrix W. In the case of the embodiment in accordance with FIG. 8, the dynamic tracking can be implemented in another way.

Figure 7:
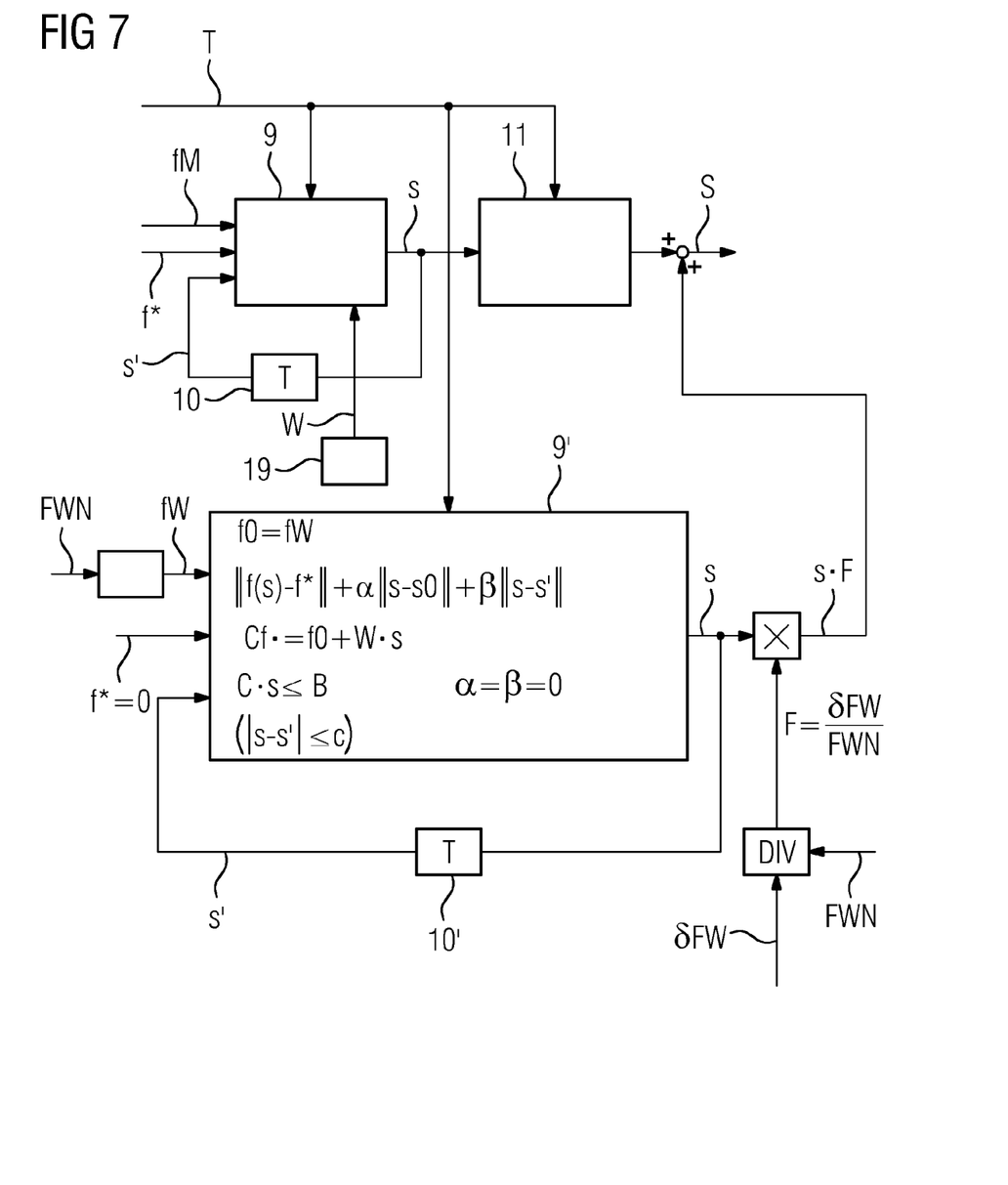

The following explains a modification of the embodiment FIG. 5 in conjunction with FIG. 7. In the context of the embodiment shown in FIG. 7, a further optimizer 9' is present. Therefore, in the following the optimizer 9' is referred to as a second optimizer for differentiation from the first optimizer 9. The second optimizer 9' is constructed in the same way as the first optimizer 9. The following explains the mode of operation of the second optimizer 9' in conjunction with FIG. 7. Reference is made to the fact that although the same variables are used in the context of the following explanation, the variables are independent of the variables used for the first optimizer 9. Therefore, the values can be different even though the same reference characters are used.

The second optimizer 9' also determines current correction values s by minimizing the relationship $$\|f(s)-f^*\|+\alpha\|s-s0\|+\beta\|s-s'\| \quad (9)$$

Therefore, the second optimizer 9' varies the current correction values s that are valid for it until it has minimized this relationship. The second optimizer 9' preferably takes account of the same ancillary conditions as the first optimizer 9. Furthermore, the second optimizer 9 preferably also determines the correction values s according to an interior-point method. However, the weighting factors $\alpha$, $\beta$ have the value 0 for the second optimizer 9'. Therefore, as a result, the second optimizer 9' optimizes the relationship $$\|f(s)-f^*\| \quad (10)$$

For this reason, the value of the correction values s' of the previous working cycle T is irrelevant for the second optimizer 9'.

Similarly to the case with the first optimizer 9—f is a totality of flatness values, i.e. once again a vector. The flatness values f are determined by the optimizer 9 on the basis of the initial flatness values f0 and the valid current correction values s for the second optimizer 9'. Similarly to the case with the first optimizer 9—the second optimizer 9' determines the flatness values f according to the relationship $$f(s)=f0+W\cdot s \quad (11)$$

However, with the second optimizer 9' initial flatness values f0 do not correspond to measured flatness values fM, but to a totality of nominal flatness values fW. These in turn correspond to a nominal change FWN in the rolling force FW. As before, W is an effectiveness matrix. It specifies individually what influence a specific individual correction values s has on which of the flatness values f. In accordance with the depiction in FIG. 7, this can in particular involve the same effectiveness matrix W as that used for the first optimizer 9.

In the case of the embodiment in accordance with FIG. 7, the control device 4 determines the manipulated variables S for the flatness actuators 8 while additionally taking account of an actual change $\delta$FW in the rolling force FW, the nominal change FWN in the rolling force FW and the current correction values s determined by means of the second optimizer 9'. In particular, the control device 4 scales the current correction values s determined by means of the second optimizer 9' with a factor F, wherein the factor F is obtained from the quotient of the actual change $\delta$FW in the rolling force FW and the nominal change FWN in the rolling force FW:

$$F=\delta FW/FWN \quad (12)$$

If applicable, furthermore, smoothing in a filter can be performed—before or after the scaling with the factor F.

As already mentioned, in the case of a software-based implementation, the individual blocks of the internal structure of the control device 4 are program modules. Therefore, in the case of the embodiment in accordance with FIG. 7 it is possible to use one and the same program module—namely the implementation of the optimizer—for both the first and second optimizer 9, 9'. In particular for this reason, the time-delay element 10' is also present in FIG. 7. The two program modules only have to be parameterized individually for the respective intended application. For, example the weighting factors $\alpha$, $\beta$ can be set to values different from 0 for the first optimizer 9 and to 0 for the second optimizer 9, 9'.

In the context of the embodiment shown in FIG. 7, the first and the second optimizer 9, 9', i.e. both the optimizer 9 whose current correction values s are supplied to the flatness controller 11 and the optimizer 9' whose current correction values s are only multiplied with the factor F. However, according to the depiction in FIG. 8, which depicts the second basic embodiment of the present invention it is also possible for only one single optimizer 9' to be present that operates as described above in conjunction with FIG. 7 for the second optimizer 9'. Therefore, in this case, the optimizer 9' whose current correction values s are only multiplied with the factor F is the sole optimizer and hence the first optimizer 9' within the meaning of the present invention.

Figure 8:
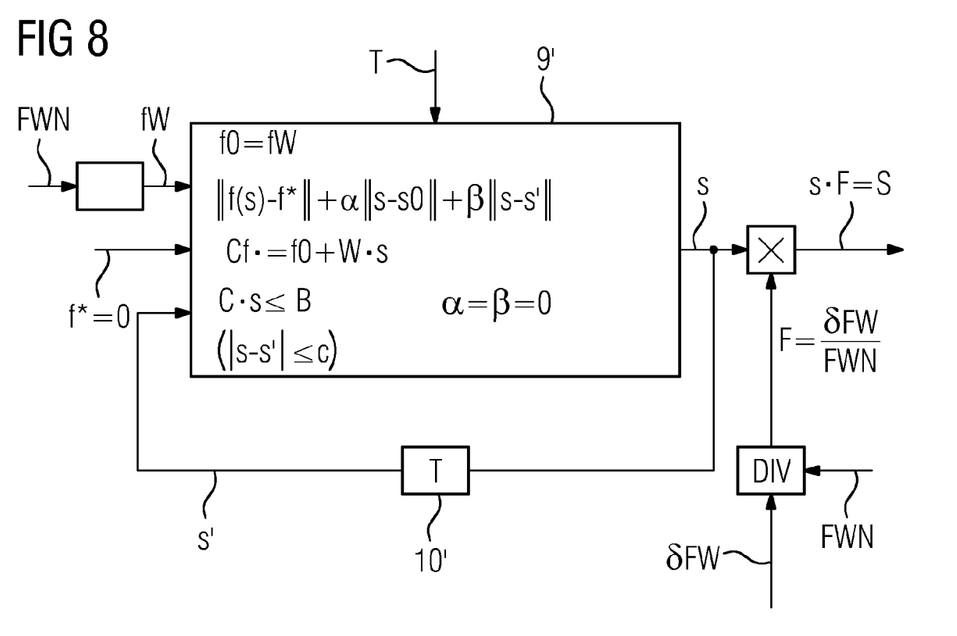

An independent separate explanation of the mode of operation of the first optimizer 9' in FIG. 8 is not necessary here since the first optimizer 9' in FIG. 8 operates in exactly the same way as the second optimizer 9' in FIG. 7.

The present invention has numerous advantages. The online-optimization enables optimum manipulated variables S to be determined in each working cycle T. Due to the embodiment of the flatness controller 11 in accordance with the observer principle, it is able to react as quickly as possible to disturbing influences or other changes. The models 14, 18 required for the implementation of the present invention are usually already present in the control device 4. As a result, there is no additional expenditure on the creation of such models 14, 18. The filter 15 enables efficient adaptation of the flatness controller 11 to the response to the interference specifically for the respective system. Furthermore, separation into the first optimizer 9 on the one hand and the flatness controller 11 on the other causes the flatness error analysis (which takes place in the first optimizer 9) to be decoupled from the dynamic behavior of the controller (which takes place in the flatness controller 11). This results in a simple, modular configuration of the control device 4 for virtually any type of stand. This simplifies parameterization of the control device 4 in the engineering phase and reduces commissioning times. Furthermore, system-specific adaptations can be made in a targeted and simple manner. Furthermore, decoupling simplifies implementation and thus errors are avoided in both the engineering phase and the commissioning phase. Optimum control extends the lifetime of the mechanical components of the roll stand. Compensation of flatness errors resulting from changes in the rolling force FW by precontrol further increases productivity due to very quick reaction to faults. The economic efficiency of the operation is increased because there are fewer rejects. Furthermore, the optimization takes account of the setting limits of the flatness actuators 8 in the context of the determination of the manipulated variables S.

Although the invention has been illustrated and described in greater detail by the preferred exemplary embodiment, the invention is not restricted by the disclosed examples and other variants can be derived herefrom by the those skilled in the art without departing from the scope of protection of the invention.

LIST OF REFERENCE CHARACTERS

1 Metal strip
2 Working rolls
3 Support rolls
4 Control device
5 Computer program
6 Machine code
7 Measuring device
8 Flatness members
9, 9' Optimizer
10, 10' Time-delay elements
11 Flatness controller
12 Multiplier
13 Nodal point
14 Plant model
15 Filter
16 Differentiator
17 Integrator
18 Models of the roll stand
19 Determining device
A Axial displacement
B, c Vectors
C Matrix
B Width
F Factor
F Flatness values
f0 Initial flatness values
fM Measured flatness values
fW Nominal flatness values
f* Flatness target values
FR Reverse bending forces
FW Rolling force
FWN Nominal change in the rolling force
K Local cooling
KP Gain factor
P Parameter
S Manipulated variables
S' Provisional signal
S1 to S7 Steps
s Correction values for the current working cycle
s' Correction values for the previous working cycle
s" Output signal from the model of the roll stand
T Working cycle
W Effectiveness matrix
α, β Weighting factors
δFW Actual change in the rolling force

The invention claimed is:

1. An operating method for a roll stand in which a metal strip is rolled, comprising:
  determining, by a control device for the roll stand in each of a working cycle of the control device, a number of manipulated variables (S) for a corresponding number of flatness actuators of the roll stand; and
  actuating, in each working cycle by the control device, the flatness actuators according to the manipulated variables (S) determined,
  wherein the control device implements a first optimizer, which initially sets current correction values (s) in a provisional manner and determines a totality of flatness values (f) according to the relationship:

$f(s)=f0+W \cdot (s-s')$ or $f(s)=f0+W \cdot s$, wherein:
    s is a totality of the current correction values,
    f0 are initial flatness values,
    W is an effectiveness matrix, and
    s' is a totality of the correction values determined in the preceding working cycle,
    and then minimizes the relationship:

$\|f(s)-f^*\|+\alpha\|s-s0\|+\beta\|s-s'\|$ to determine the current correction values (s) by varying the current correction values (s),
  wherein:
    f* is a totality of flatness target values,
    s0 is a totality of target values for the current correction values (s), and
    α and β are weighting factors,
  wherein the first optimizer considers linear limiting conditions when determining the current correction values (s),
  wherein the linear limiting conditions have the form:

$C \cdot s \leq B$ or the form:

$C \cdot s \leq B$ and $|s-s'| < c$, wherein C is a matrix, B is a vector consisting of the limiting conditions to be upheld by the current correction values (s) and c is a vector consisting of the limiting conditions to be upheld by the difference between the current correction values (s) and the correction values (s') of the preceding working cycle,
  wherein the control device supplies the current correction values (s) determined by the first optimizer to a flatness controller which determines from the current correction values (s) the manipulated variables S for the flatness actuators,
  wherein the control device implements a second optimizer,
  wherein the totality of flatness values (f) for the second optimizer is determined based on a totality of nominal flatness values (fW) and the current correction variables (s) valid for the second optimizer,
  wherein the nominal flatness values (fW) correspond to a nominal change (FWN) in the rolling force (FW),
  wherein the weighting factors (α, β) for the second optimizer have the value 0, and
  wherein the control device determines the manipulated variables (S) for the flatness actuators while additionally taking into account an actual change (δFW) in the rolling force (FW), the nominal change (FWN) in the rolling force (FW) and the current correction values (s) determined by the second optimizer.

2. The operating method as recited in claim 1, wherein:
a measuring device is used to detect measured flatness values (fM) over the width of the metal strip, and
the measured flatness values (fM) and the associated flatness target values (f*) are supplied to the control device as initial flatness values (f0).

3. The operating method as recited in claim 2, wherein:
the control device implements a flatness controller arranged downstream of the first optimizer to which the current correction values (s) determined by the first optimizer are supplied and which flatness controller determines change values for the manipulated variables (S) for the flatness actuators from the current correction values (s),
the flatness controller forms a sum of the current correction values (s) weighted with a gain factor (KP) and an output signal (s") from a plant model of the roll stand,
the flatness controller determines a provisional signal (S') based on said sum,
the flatness controller determines change values for the manipulated variables (S) for the flatness actuators by differentiating the provisional signal (S'), and
the evenness controller supplies the provisional signal (S') to the plant model of the roll stand as an input signal.

4. The operating method as recited in claim 3, wherein the flatness controller determines the provisional signal (S') by filtering the sum by means of a filter.

5. The operating method as recited in claim 4, wherein the control device dynamically parameterizes the filter.

6. The operating method as recited in claim 1, wherein:
the initial flatness values (f0) correspond to a totality of nominal flatness values (fW),
the nominal flatness values (fW) correspond to a nominal change (FWN) in the rolling force (FW),
the weighting factors ($\alpha$, $\beta$) have the value 0, and
the control device determines the manipulated variables (S) for the flatness actuators taking account of an actual change ($\delta$FW) in the rolling force (FW), the nominal change (FWN) in the rolling force (FW) and the current correction values (s) determined.

7. The operating method as recited in claim 1, wherein the first optimizer varies the current correction values (s) in a plurality of iterations.

8. The operating method as recited in claim 7, wherein the first optimizer stops varying the current correction values (s) when at least one of:
the first optimizer has carried out a predetermined number of iterations;
the first optimizer has varied the current correction values (s) for a predetermined time;
the current correction values (s) only change insignificantly from iteration to iteration; or
the relationship:

$$\|f(s)-F^*\|+\alpha\|s-s0\|+\beta\|s-s'\|$$

only changes insignificantly.

9. The operating method as recited in claim 7, wherein the first optimizer considers the limiting conditions in each iteration.

10. The operating method as recited in claim 1, wherein the first optimizer determines the correction values (s) according to an interior-point method.

11. The operating method as recited in claim 10, wherein the control device determines the effectiveness matrix (W) automatically on the basis of models of the roll stand.

12. The operating method as recited in claim 11, wherein the control device dynamically redetermines the effectiveness matrix (W) each time before the rolling of a respective metal strip.

13. The operating method as recited in claim 12, wherein the control device dynamically tracks the effectiveness matrix (W) during the rolling of the respective metal strip.

14. A computer program comprising machine code that can be executed by a control device for a roll stand for rolling a metal strip, wherein the execution of the machine code by the control device causes the control device to operate the roll stand according to an operating method as recited in claim 1.

15. A control device for a roll stand for rolling a metal strip, wherein the control device is embodied as a software-programmable control device and programmed with a computer program as recited in claim 14.

16. A roll stand for rolling a metal strip,
wherein the roll stand comprises a number of flatness actuators that are able to influence the flatness of the metal strip emerging from the roll stand,
wherein the roll stand comprises a control device for the roll stand for rolling the metal strip, the control device being embodied as a software-programmable control device programmed with a computer program, the computer program comprising machine code that can be executed by the control device, and
wherein the execution of the machine code by the control device causes the control device to operate the roll stand according to an operating method, by which the flatness actuators of the roll stand are actuated according to the operating method as recited in claim 1.

* * * * *